United States Patent
Bisson

[11] Patent Number: 5,135,055
[45] Date of Patent: Aug. 4, 1992

[54] GROUND AND AIRBORNE FIRE FIGHTING SYSTEM AND METHOD OF FIGHTING HIGH RISE BUILDING FIRES

[76] Inventor: Theodore J. Bisson, 1902 Sierra Vista, Tustin, Calif. 92680

[21] Appl. No.: 671,258

[22] Filed: Mar. 18, 1991

[51] Int. Cl.$^5$ .................... A62C 31/00; A62C 27/00
[52] U.S. Cl. ..................................... 169/53; 169/70
[58] Field of Search .................. 169/52, 53, 54, 24, 169/43, 46, 70, 13; 244/136, 137.2

[56] References Cited

U.S. PATENT DOCUMENTS

| | | | |
|---|---|---|---|
| 3,494,423 | 2/1970 | Stansbury et al. | 169/53 X |
| 3,714,987 | 2/1973 | Mattson | 169/47 |
| 3,759,330 | 9/1973 | Rainey et al. | 169/47 |
| 4,090,567 | 5/1978 | Tomlinson | 169/53 |

FOREIGN PATENT DOCUMENTS

| | | | |
|---|---|---|---|
| 300746 | 1/1989 | European Pat. Off. | 169/53 |
| 317891 | 5/1989 | European Pat. Off. | 169/70 |
| 2000598 | 7/1971 | Fed. Rep. of Germany | 169/70 |
| 2420355 | 10/1979 | France | 169/53 |
| 2106385 | 4/1983 | United Kingdom | 169/70 |

Primary Examiner—Margaret A. Focarino
Assistant Examiner—Andrew C. Pike
Attorney, Agent, or Firm—Harold L. Jackson

[57] ABSTRACT

A ground and airborne system and method for fighting high rise building fires uses a ground based pump such as a mobile pumper vehicle with its inlet connected to a source of fire retardant material such as water. A rotary wing aircraft is provided with another pump, the inlet of which is connected to the outlet of the pumper through a flexible hose. The aircraft carries one or two extendable booms with nozzles affixed to the ends thereof. The booms are connected to the outlet of the airborne pump. The aircraft is manuevered to the floor at which the fire is located. The boom or booms are extended beyond the rotor tips and the ground and airborne pumps are operated to direct water into the floor at which the fire is located to extinguish or contain the fire until a fire crew can arrive at the scene.

11 Claims, 4 Drawing Sheets

GROUND AND AIRBORNE FIRE FIGHTING SYSTEM AND METHOD OF FIGHTING HIGH RISE BUILDING FIRES

BACKGROUND OF THE INVENTION

The present invention relates to a system and method for suppressing fires in multi-storied or high rise windowed structures and more particularly to such systems which employ aircraft for delivering a fire retardant material to the fire site.

DESCRIPTION OF THE PRIOR ART

Modern high rise buildings generally include overhead sprinkler systems for suppressing or containing fires in high rise buildings. While such sprinklers may be adequate to extinguish or contain some minor fires they are generally inadequate to extinguish or even contain intense fires produced by many flammable building materials. Furthermore, such sprinkler systems are not always operative due to system failures or shutdown periods for maintenance, leaving the building vulnerable to a fire.

Some buildings are equipped with pipes called stand pipes, running through the center core of the buildings and through which water may be pumped from a fire truck located outside of the building. Stand pipes will provide water for the firefighters to use on any level. However, to use such systems, the firefighters must carry all of their equipment such as hoses, nozzles, self-contained breathing apparatus, etc. with them to the floor that is burning. Since elevators will not be in use for safety reasons, the firefighters must climb stairs. If the fire is located many floors above the ground level such procedure is time consuming and fatiguing. Furthermore, the intense heat and smoke (if breathing apparatus is not available) along with the fatigue factor makes it extremely dangerous to the men and women who have to fight the fire. Time is of the essence in fighting fires. There is a need to provide some means to contain or slow the spread of the fire until firefighters arrive on the scene.

Several prior art systems utilizing rotary wing aircraft (e.g. helicopters) have been proposed for this purpose. However, such systems have limitations as discussed below:

U.S. Pat. No. 4,090,567 describes a helicopter that can direct water from a large exchangeable tank directly into the fire. However, the amount of water necessary to contain and/or fight a fire of any significant size can empty a large water tank very quickly. The time required for the helicopter to leave the scene and exchange tanks will undoubtedly allow the fire to spread further thereby eliminating the advantage gained in the initial attack.

U.S. Pat. No. 3,897,829 describes a system similar to that disclosed in the '567 patent except that the helicopter may recharge its water tanks by suctioning water from a body of water such as a lake. This system suffers from the same disadvantages as the one described in the '567 patent.

A prior art apparatus which is designed for fighting ground fires and not high rise building fires is described in U.S. Pat. No. 3,759,330 in which several helicopters equipped with pumps are arranged to supply water to a deluge rig carried by another helicopter.

U.S. Pat. No. 3,714,987 describes another helicopter carried fire suppression apparatus in which the fire retardant liquid is carried within a tank on a helicopter. Other helicopter supported tank systems are described in U.S. Pat. Nos. 3,494,423 and 3,580,339 in which the fire-retardant material is sprayed into the rotor down wash.

There is a need for a method and an apparatus capable of remaining on location at the fire site in a high rise building to contain the fire until ground crews can arrive at the scene to extinguish the fire.

SUMMARY OF THE INVENTION

In accordance with the apparatus aspect of my invention a combined ground and airborne system is provided for utilizing a source of fire retardant material, such as water, at ground level. The apparatus includes a first pump, such as a mobile pumper vehicle, located at or near ground level. The inlet of the first pump is connected to the source of fire retardant material. An aircraft (such as a helicopter) arranged to maneuver to a selected altitude and hover at that altitude carries a second pump.

The aircraft also carries a boom and nozzle connected to the outlet of the second pump for directing the fire retardant material into the fire area through an opening, such as a broken window or windows, in the building's exterior. A flexible conduit such as a conventional canvas fire hose is connected between the outlet of the first pump and the inlet of the second pump so that fire retardant material may be continuously directed into the fire area from the aircraft until the fire is extinguished or until ground crews arrive at the scene and take over the fire fighting task. If desired, the aircraft may be equipped with reservoir tanks for holding a quantity of the fire retardant material. The retardant material in the tanks may be supplied under pressure to the boom via bypass air from the aircraft's engines or via the pump carried by the aircraft while the aircraft is waiting for a hook up with the ground based pump.

In accordance with my novel method an aircraft as previously described and equipped is maneuvered into place adjacent the floor of a high rise building at which the fire is located. A ground based pump is positioned near the source of fire retardant material with its inlet connected to such source. A flexible hose is connected between the outlet of the ground based pump and the inlet of the airborne pump in the aircraft. The pumps are then operated and the boom and nozzle positioned to discharge the fire retardant material into the fire site.

The features of the present invention can be best understood by reference to the following description taken in conjunction with the accompanying drawings wherein like components are designated by like reference numerals.

DESCRIPTION OF THE PREFERRED EMBODIMENT

Figure 1:
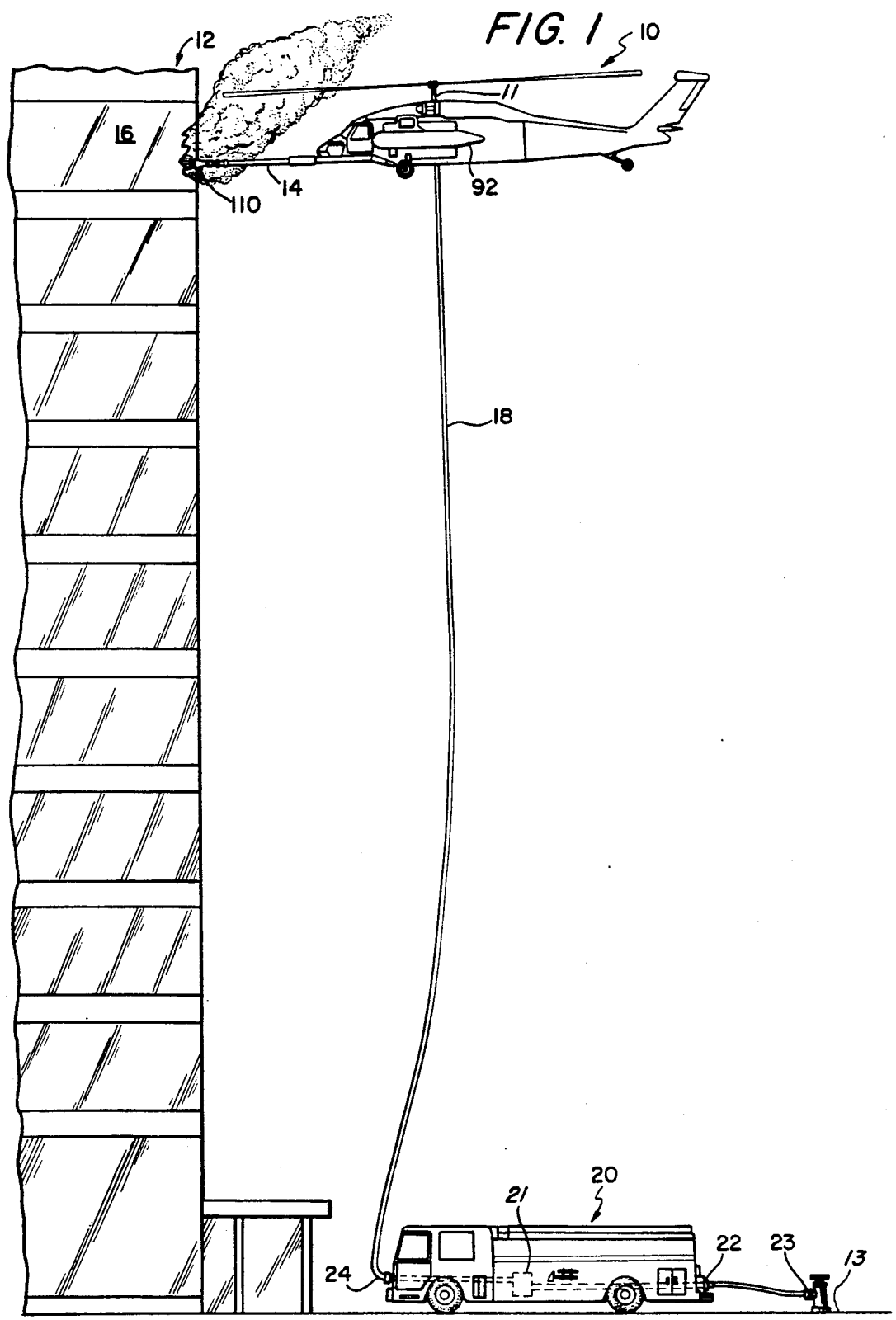
FIG. 1 is a side elevation view of an apparatus in accordance with my invention deployed adjacent a multi-storied structure.

Referring now to the drawings and particularly to FIG. 1 a rotary wing aircraft or helicopter 10, capable of maneuvering to a selected altitude and hovering at that altitude, is illustrated as positioned adjacent the tenth floor of a high rise windowed building 12 supported on the ground 13. The helicopter 10 includes two engines (e.g. jet engines) 11 (only one of which is shown) and carries two booms, 14 and 15, equipped with nozzles (to be described) one of which i.e., 14 is shown extending through an opening in the window 16 for directing a fire retardant material into the fire area on the tenth floor. The helicopter caries a pump (to be described) which receives water via a flexible conduit 18 such as a conventional canvas fire hose from a ground based pump in the form of a fire engine pumper vehicle 20. The pumper includes a conventional high volume capacity liquid pump 21 with its inlet 22 connected to a ground based source of fire retardant material 23 (e.g., a water hydrant) and its outlet 24 connected to the fire hose 18 as illustrated.

The helicopter 10 carries four reservoir tanks (to be described) which provide an airborne source of fire retardant material that may be used to suppress or contain the fire pending the arrival of the pumper 20 as will be more fully explained.

Figure 2:
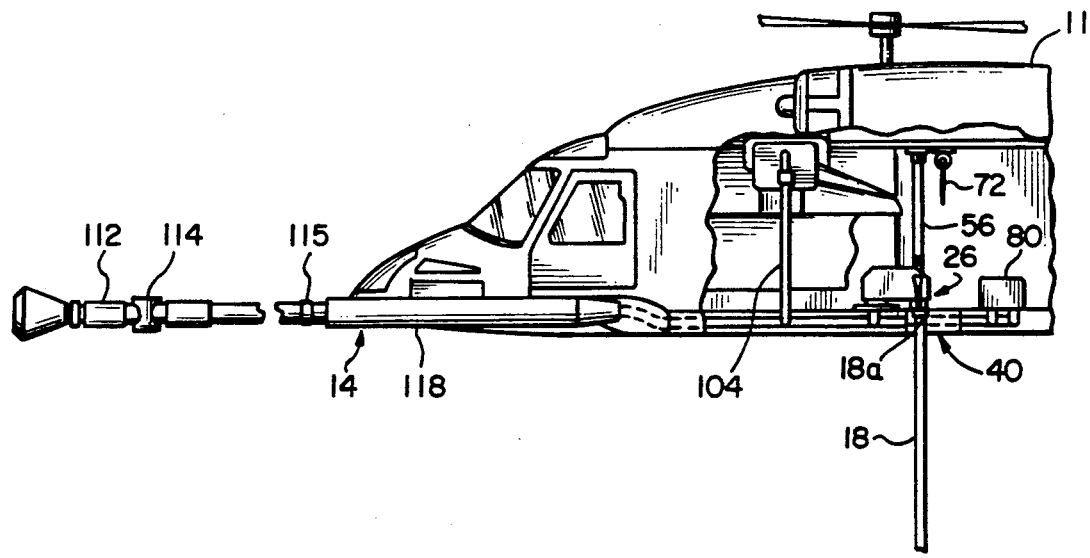
FIG. 2 is an enlarged side elevation view of the aircraft of FIG. 1 partially cut away showing the flexible conduit extending through the cargo hold opening.
Figure 3:
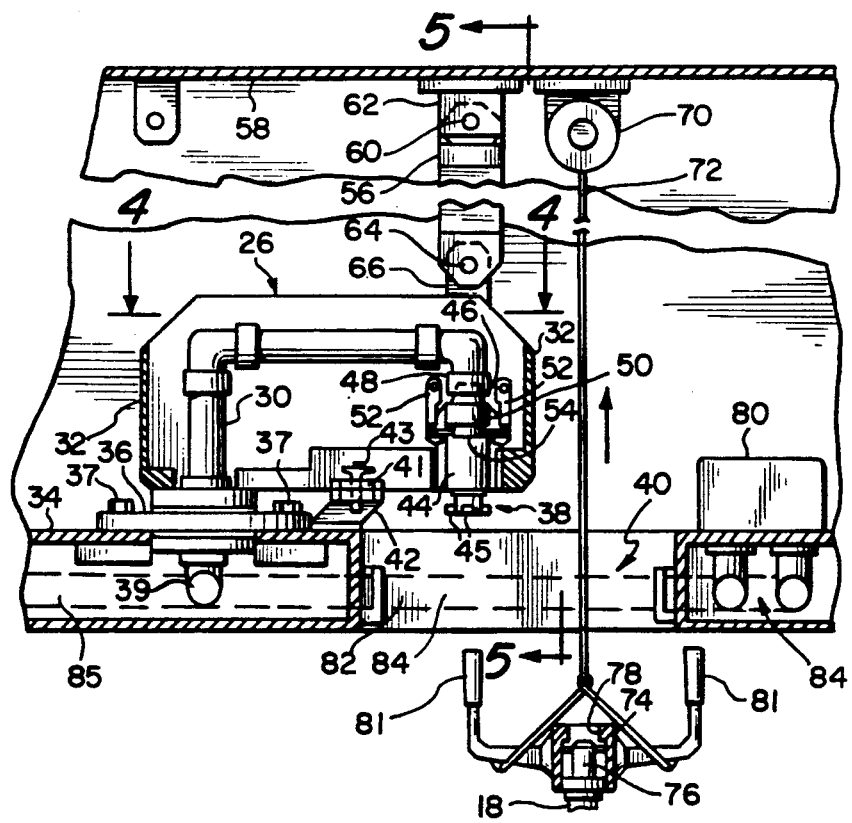
FIG. 3 is a side elevation view, partially in section, of the floor mounted receptacle mechanism within the aircraft for receiving the flexible conduit from the ground based pump.

Referring now to FIGS. 2 and 3 the cargo hold area of the helicopter is equipped with a floor mounted receptacle 26 for receiving the upper or remote end 18a of the fire hose 18.

Figure 4:
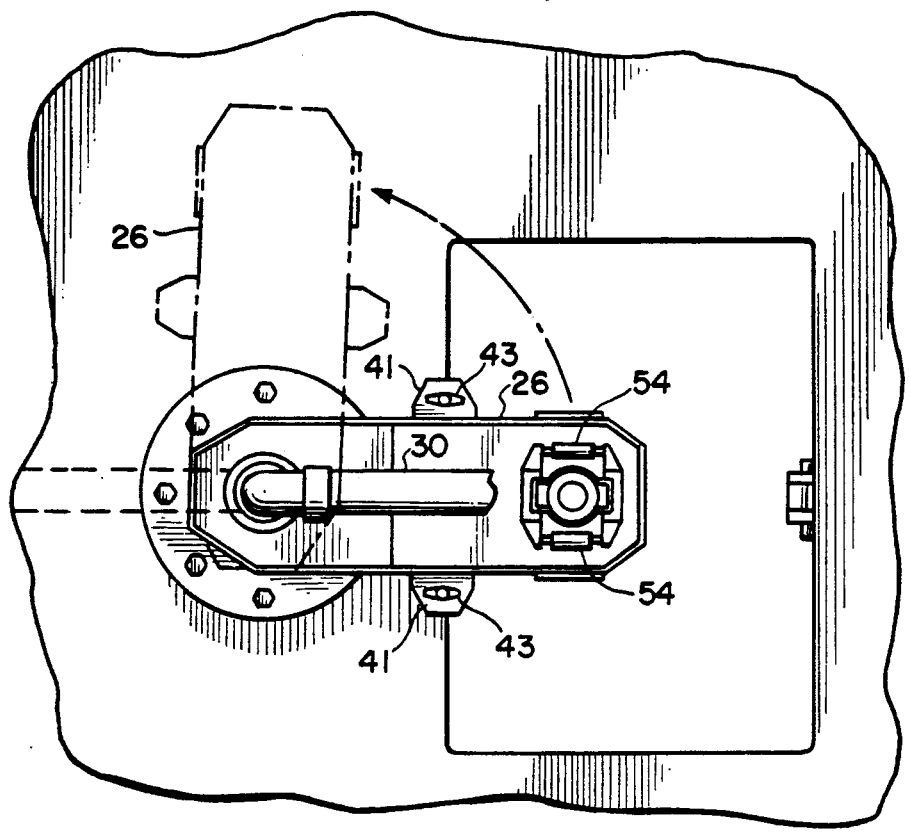
FIG. 4 is a top plan view taken along lines 4—4 of FIG. 3.
Figure 5:
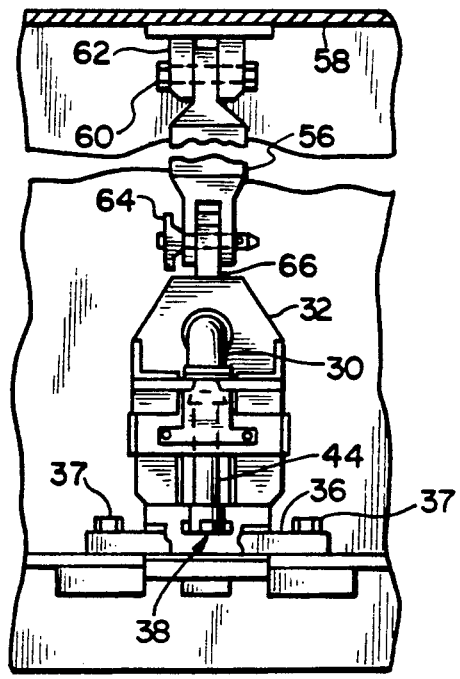
FIG. 5 is a sectional view taken along lines 5—5 of FIG. 3.

The receptacle 26 comprises a U-shaped conduit or piping arrangement 30 enclosed within an outer housing 32. The receptacle 26 is mounted on the floor 34 of the helicopter via a bearing 36 and bolts 37. The bearing 36 allows the receptacle to be positioned so that the inlet end 38 thereof is over the cargo hold opening 40 to receive the hose 18 or rotated through an angle of 90° when not in use to leave the opening 40 unobstructed. The housing 32 includes two load bearing support plates 41 which rest on support brackets 42 when the receptacle is rotated to its in-use position as shown in FIGS. 3 and 4. The support brackets are mounted on the floor 34. Retractable pins 43 are inserted through holes in the brackets 41 and 42 to maintain the receptacle in its in-use position.

The inlet end 38 of the receptacle 26 is formed by a tubular section 44 having locking tabs 45 at one end thereof and a conical section 46 at the other end which sealingly engages a cylindrical opening in a collar 48 in the U-shaped section 30. The tubular section 44 includes a pair of shoulders 50 which are engaged by the lower ends of locking arms 52. The locking arms 52 are pivotally mounted at their upper ends to the housing 32. A pair of solenoids 54 extend between the lower ends of the locking arms 52 and when actuated during an emergency situation force the arms 52 outwardly and allow the tubular section 44 and the fire hose connected thereto to fall by gravity away from the helicopter.

A receptacle support bar 56 is mounted to the roof 58 of the helicopter via pin 60 and bracket 62. The support bar is connected to the receptacle support housing 32 by means of pin 64 and bracket 66. A hoist 70 is also mounted to the roof 58 and includes a cable 72 for lifting the upper end of the hose 18 into the aircraft as is illustrated in FIG. 3. The upper end of the hose 18 is equipped with an annular collar 74 surrounding a tubular fitting 76 which is arranged to be inserted in the inlet end 38 of the receptacle 26. The collar 74 includes four inwardly projecting lugs 78 (spaced at 90° intervals) which form a bayonet connection with the lugs 45 at the inlet end of the receptacle 26 to secure the hose to the receptacle.

A pair of arms 81 allow personnel within the helicopter to position the hose fitting 76 within the receptacle inlet end 38 and subsequently rotate the fitting through 90° to position the lugs 78 over the lugs 45.

Figure 6:
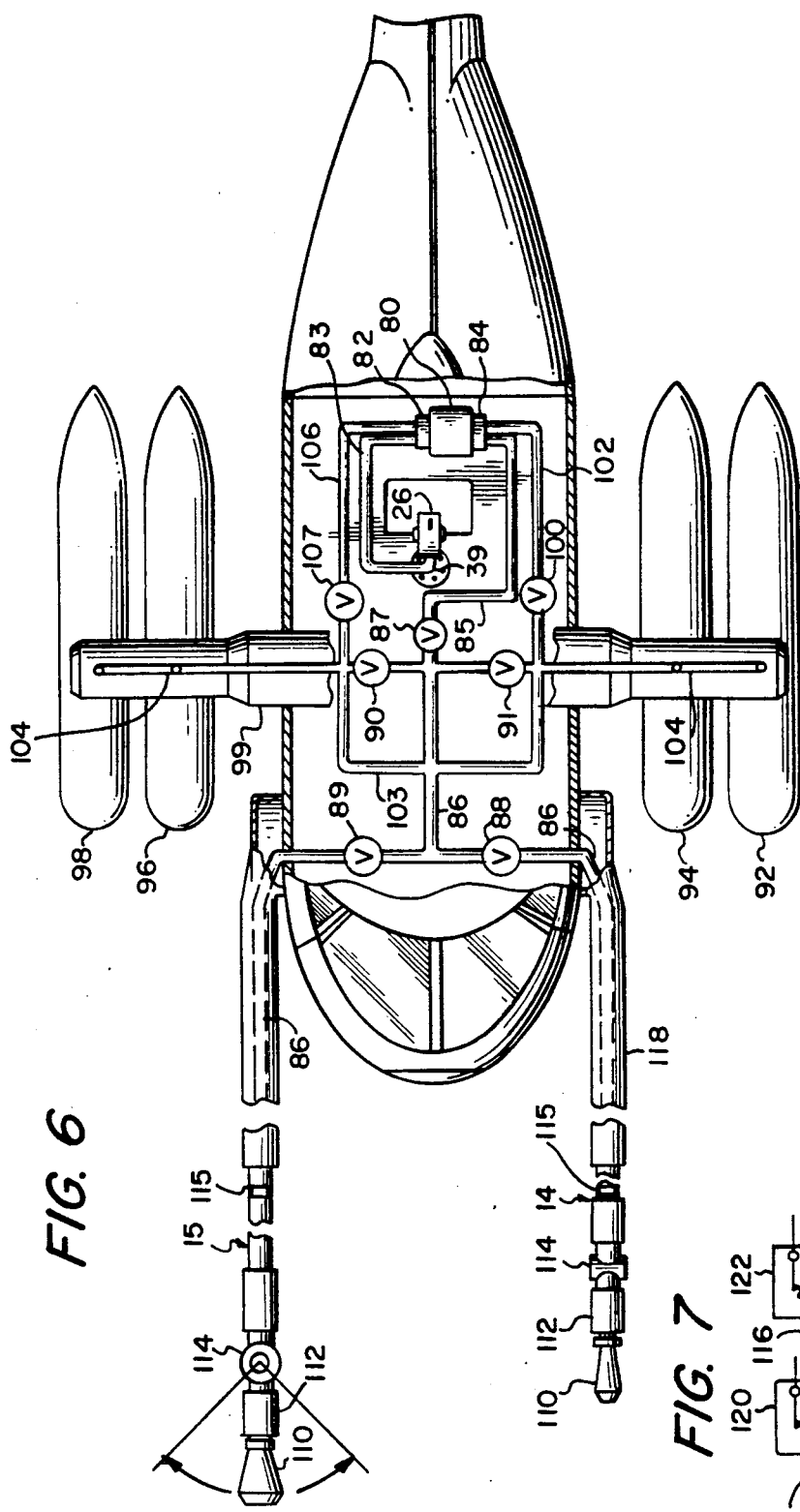
FIG. 6 is a top plan view of the aircraft of FIG. 1, partially broken away and schematically illustrating the piping arrangement within the aircraft for applying fire retardant material to the disbursement booms.

An electrically operated pump 80 carried by the helicopter has its inlet 82 (shown in FIG. 6) connected to an outlet 39 of the receptacle 26 through piping 83 located within the floor of the helicopter as shown by the dashed lines in FIG. 3. The outlet 84 of the pump 80 (shown in FIGS. 3 and 6) is connected to the booms 14 through piping sections 85, 86 and electrically operated valves 87, 88, and 89 as is shown in FIG. 6. The pump outlet 84 is also connected to four helicopter wing tanks 92, 94, 96, and 98 through valve 100 and piping sections 102, 103, and 104 to allow the tanks to be filled with the pump. The tanks 92-98 (which are supported by wing struts 99) are also connected to the pump inlet 82 and through piping sections 103, 104, 106 and valve 107 so that fire retardant liquid within the tanks may be supplied to the booms via the pump 80. Alternatively, bypass bleed air from the helicopter engines 11 may be utilized to force liquid from the tanks directly to the booms via (open) valves 90, 91, 88, and 89 or to the booms via the pump 80 through (open) valves 107, 87, 88, and 89. Each tank may be provided with a separate valve to allow one or more of the tanks to be emptied or filled at a time.

Each boom carries a nozzle 110 at the end thereof for directing the fire retardant material such as water into the fire area.

Each nozzle emits a fan shaped spray and may be rotated through a angle of 360° via electrically operated coupling 112. Each nozzle may also be pivoted relative to the respective boom through an angle within the range of 20° to 60° and preferably 45° with respect to the boom via swivel joint 114 as is illustrated in FIG. 6 with respect to boom 15.

The booms may be selectively extended so that the nozzles extend beyond the rotor blade tip path to prevent rotor-wash from interfering with the discharged spray and allow the pilot to break a window or windows with the nozzle tips which are preferably made of appropriate material such as steel. If desired one or both of the nozzles may be equipped with a projectile which is discharged at a relatively high velocity by the high pressure water from the pump 80 and directed at the surface such as a window to be penetrated. Such an arrangement is described in U.S. Pat. No. 4,090,567 in connection with FIG. 4.

The booms include an electrically actuated detonating device 115 located within the rotor wash area for severing the distal ends of the booms when actuated in case of an emergency during in-flight operation. For example, the booms can be jettisoned by the helicopter pilot if they become entangled with the building endangering the helicopter crew and people on the ground.

Figure 7:
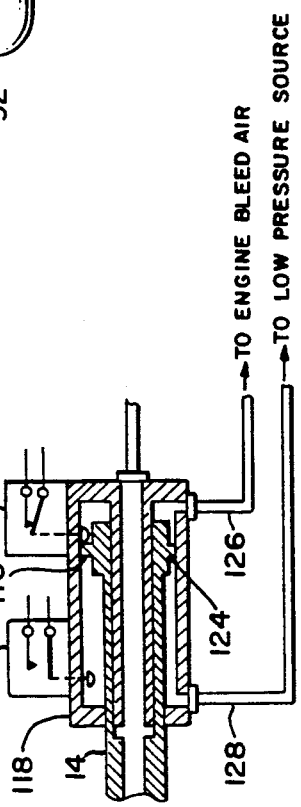
FIG. 7 is a cross-sectional view of a portion of one of the booms showing the piston-cylinder assembly for extending and retracting the boom.

A mechanism for selectively extending and retracting the booms is illustrated in FIG. 7 and includes a piston 116 carried by the distal end of the boom and a cylinder 118 mounted on the helicopter at the proximal end of the boom. Extend and retract limit switches 120 and 122, respectively, are actuated by an annular ring 124 on the cylinder to limit the boom's travel in a well known manner. Bleed air is supplied by a suitable valve (not shown) to a line 126 to drive the piston 116 and distal end of the boom outwardly. A source of low pressure air (not shown) is connected to a line 128 via a valve (not shown) for returning the piston 116 and the boom to their retracted position.

In operation, the helicopter, with its wing tanks full of fire retardant material, such as water, may be flown to the scene of a high rise building fire. If a ground based pump such as a fire engine pumper is not available at that time, the helicopter may be maneuvered to the floor where the fire is located. One or both booms may then be extended so that the nozzle(s) is positioned beyond the rotor blade tips by the use of engine bleed air as discussed previously. The nozzle or nozzles carried by the extended boom(s) may then be forced against one or more windows adjacent the fire area to break the same (if necessary) to provide one or more suitable openings for fire retardant material from the nozzle(s) to sprayed into the fire area. Fire retardant liquid may then be supplied to the boom(s) and nozzle(s) by utilizing engine bleed air and/or the pump 80. The nozzle(s) may be suitably adjusted to appropriately deliver the fire retardant liquid to the fire area to suppress or contain the fire pending the arrival of the pumper 20.

Once the pumper 20 has arrived at the scene and the inlet of the pump therein has been connected to a fire hydrant or another suitable source of fire retardant liquid, the helicopter may descend to the ground level so that the fire hose 18 may be connected between the pumper outlet and the inlet of the helicopter carried pump 80 via the receptacle 26. The helicopter may then be flown to the building floor under fire.

Alternatively, the hoist cable 72 may be used to raise the outlet end of the fire hose to the helicopter while the helicopter is hovering adjacent the building floor under fire. Both the ground and helicopter based pumps may then be operated to supply the fire retardant material from the source 23 to the fire area until the fire is extinguished or firemen arrive at the floor.

There has thus been described a novel and efficient ground and airborne system and method for fighting fires in high rise structures. Various modifications will be apparent to those skilled in the art without involving any departure from the spirit and scope of may invention as defined in the appended claims.

What is claimed is:

1. A ground and airborne firefighting system for fighting a fire in a floor of a high rise windowed structure utilizing a source of fire retardant material at or near a ground level of the structure comprising:

a first pump located at or near the ground level of the structure and having an inlet and an outlet, the inlet being arranged to be connected to the source of the fire retardant material;

an aircraft having a hull and constructed and arranged to maneuver to a selected altitude adjacent the floor in which said fire is located and hover at that altitude;

a second pump carried by the aircraft having an inlet and an outlet;

a boom and a nozzle carried by the aircraft and connected to the outlet of the second pump;

a flexible conduit having one end connected to the outlet of the first pump and a remote end connected to the inlet of the second pump whereby the fire retardant material from the ground level source may be delivered to the structure at a location above the ground level; and the aircraft being further provided with a cargo hold opening and a rotatably mounted receptacle connected at one end to the second pump inlet and connected on another end to said remote end of the flexible conduit for providing fluid communication between the second pump inlet and the remote end of the flexible conduit, the receptacle being arranged to rotate to a position over the cargo hold opening for connection to the flexible conduit or to a stored position beyond the opening.

2. The firefighting system of claim 1 wherein the nozzle includes means for breaking at least one window of the windowed structure adjacent the fire in said floor while the aircraft is hovering at said selected altitude.

3. The firefighting system of claim 2 further including a quick disconnect coupling carried by the aircraft and connected between the inlet of the second pump and the remote end of the flexible conduit, whereby the remote end of the conduit may be connected to or disconnected from the inlet of the second pump while the aircraft is in flight.

4. The firefighting system of claim 1 wherein the boom includes a distal portion and a proximal portion mounted on the aircraft hull, the boom being constructed and arranged to extend or retract the distal portion thereof relative to the aircraft hull.

5. The firefighting system of claim 4 further including boom severing means for selectively severing the distal portion of the boom from the aircraft.

6. The firefighting system of claim 4 further including a hoist carried by the aircraft for lifting said remote end of the flexible conduit from the ground level to the aircraft while in a hovered position at said selected altitude.

7. The fire fighting system of claim 4 further including means for rotating the nozzle through 360° and for pivoting the nozzle relative to the boom through an angle within a range of 20° to 60°.

8. The firefighting system of claim 4 further including means carried by the boom for selectively severing the distal portion of the boom in an emergency.

9. The firefighting system of claim 1 further including at least one reservoir tank carried by the aircraft for holding a fire retardant material and means for delivering the fire retardant material from the tank to the boom.

10. The firefighting system of claim 9 wherein the means for delivering the fire retardant material from the aircraft tank to the boom includes the second pump.

11. The firefighting system of claim 9 wherein the aircraft includes an engine which provides bypass air under pressure and wherein the means for delivering the fire retardant material from the aircraft tank to the boom includes means for directing the engine bypass air into the tank.

* * * * *